UNITED STATES PATENT OFFICE.

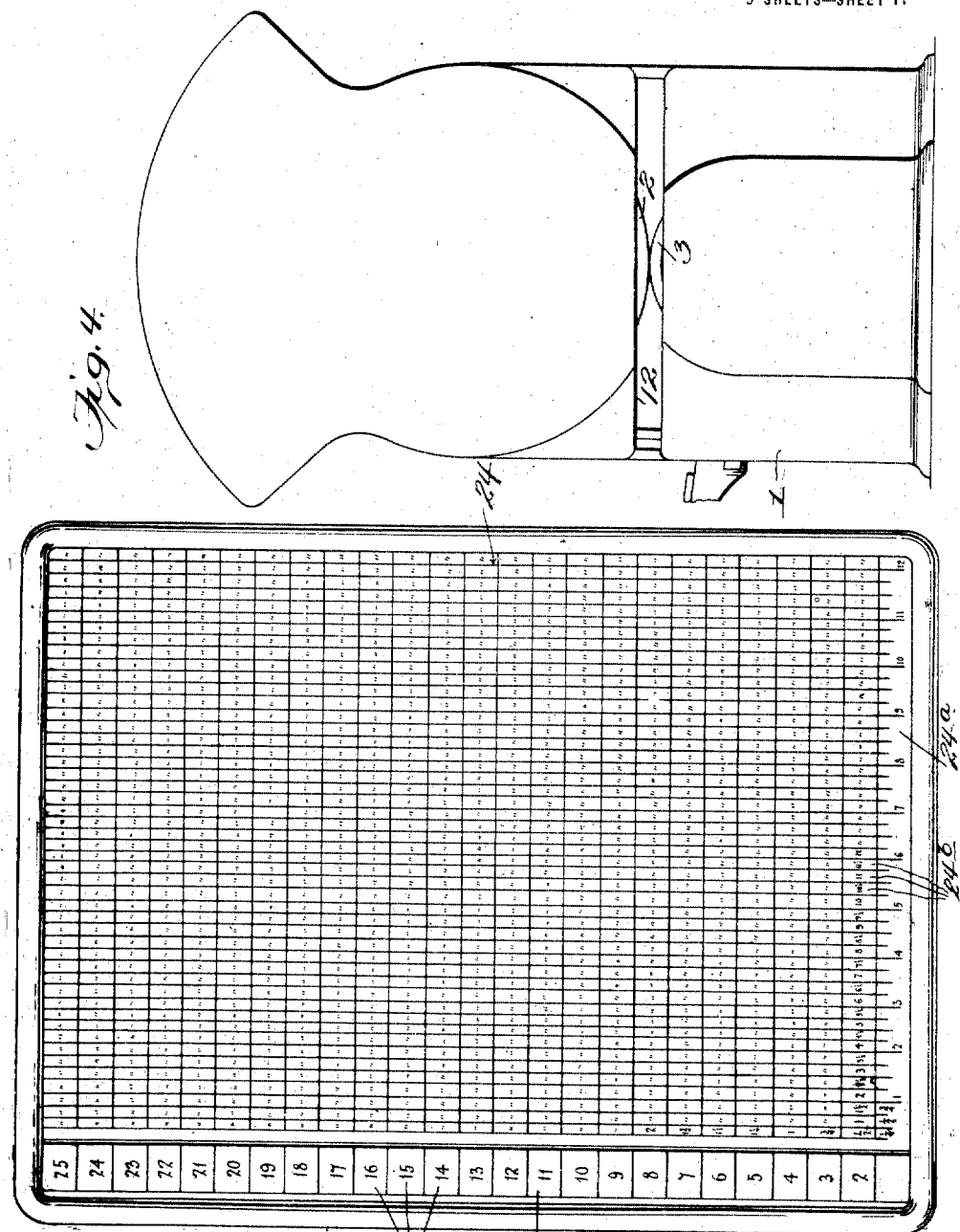

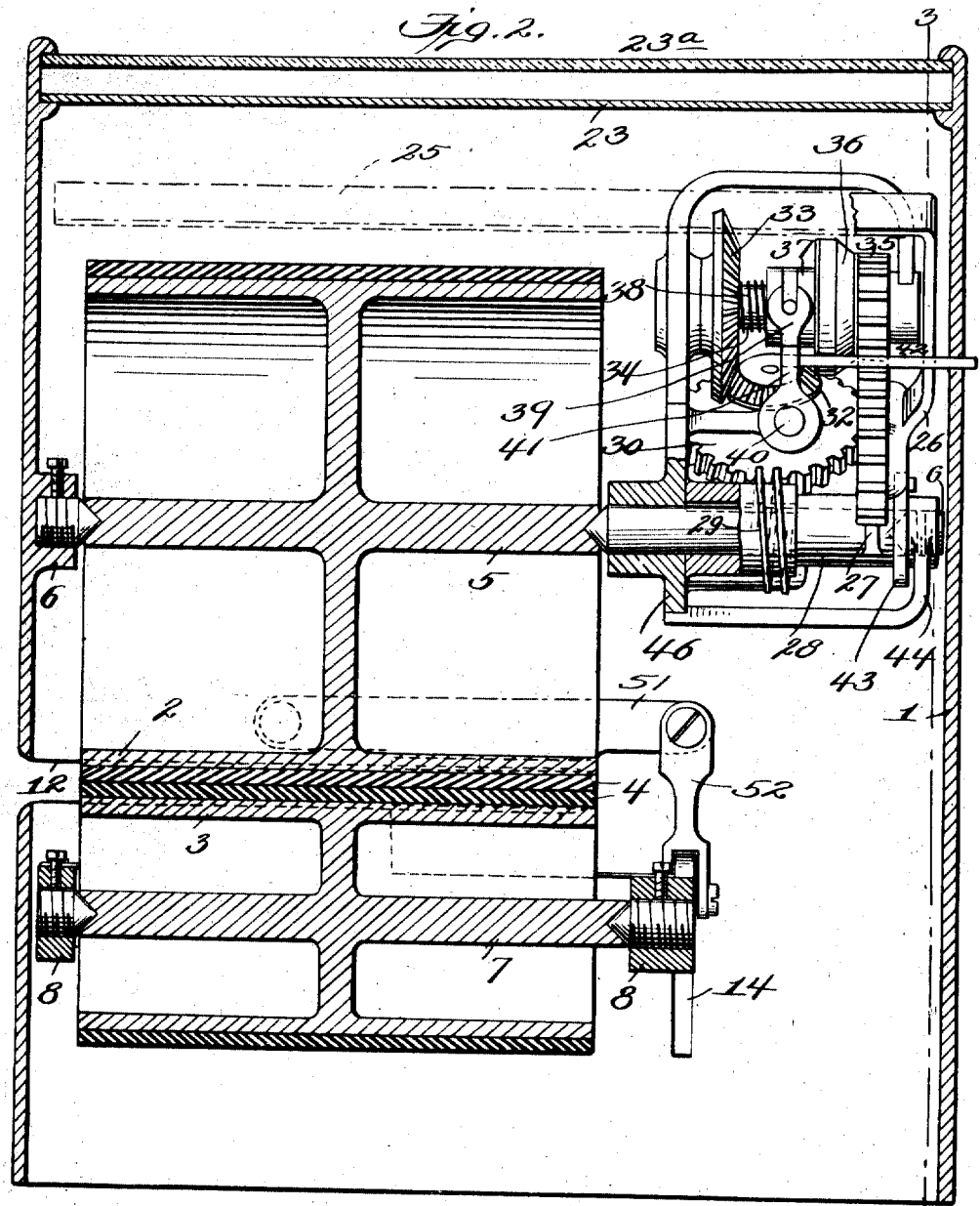

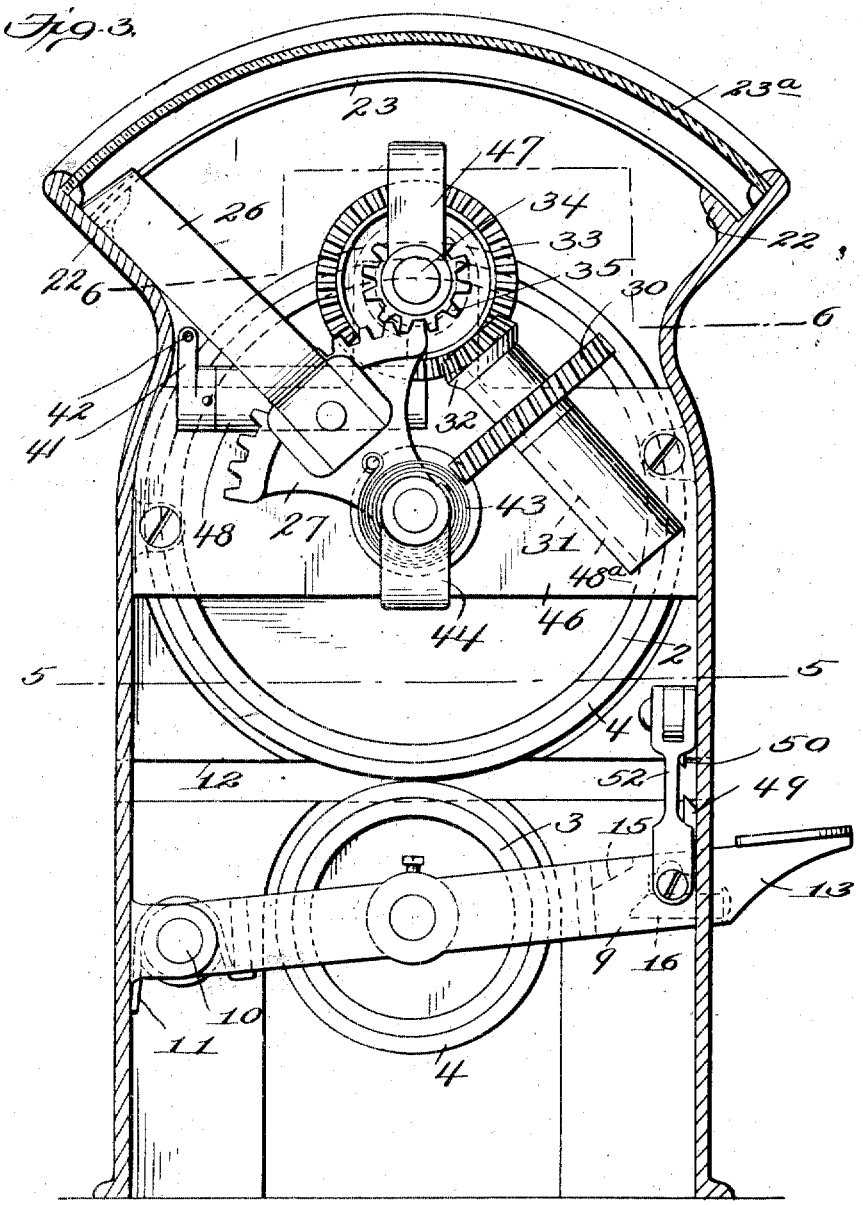

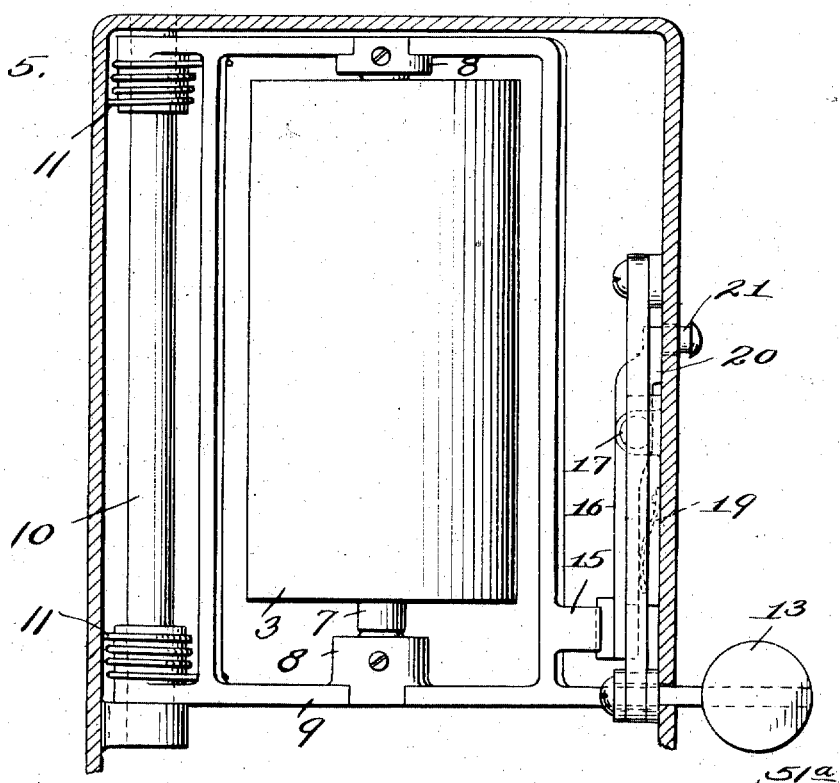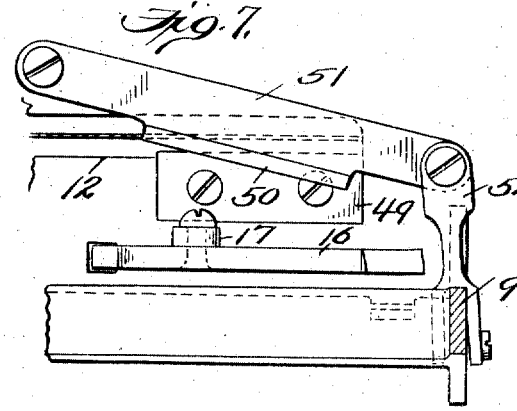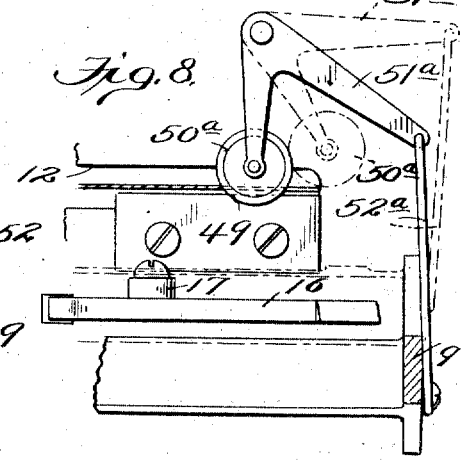

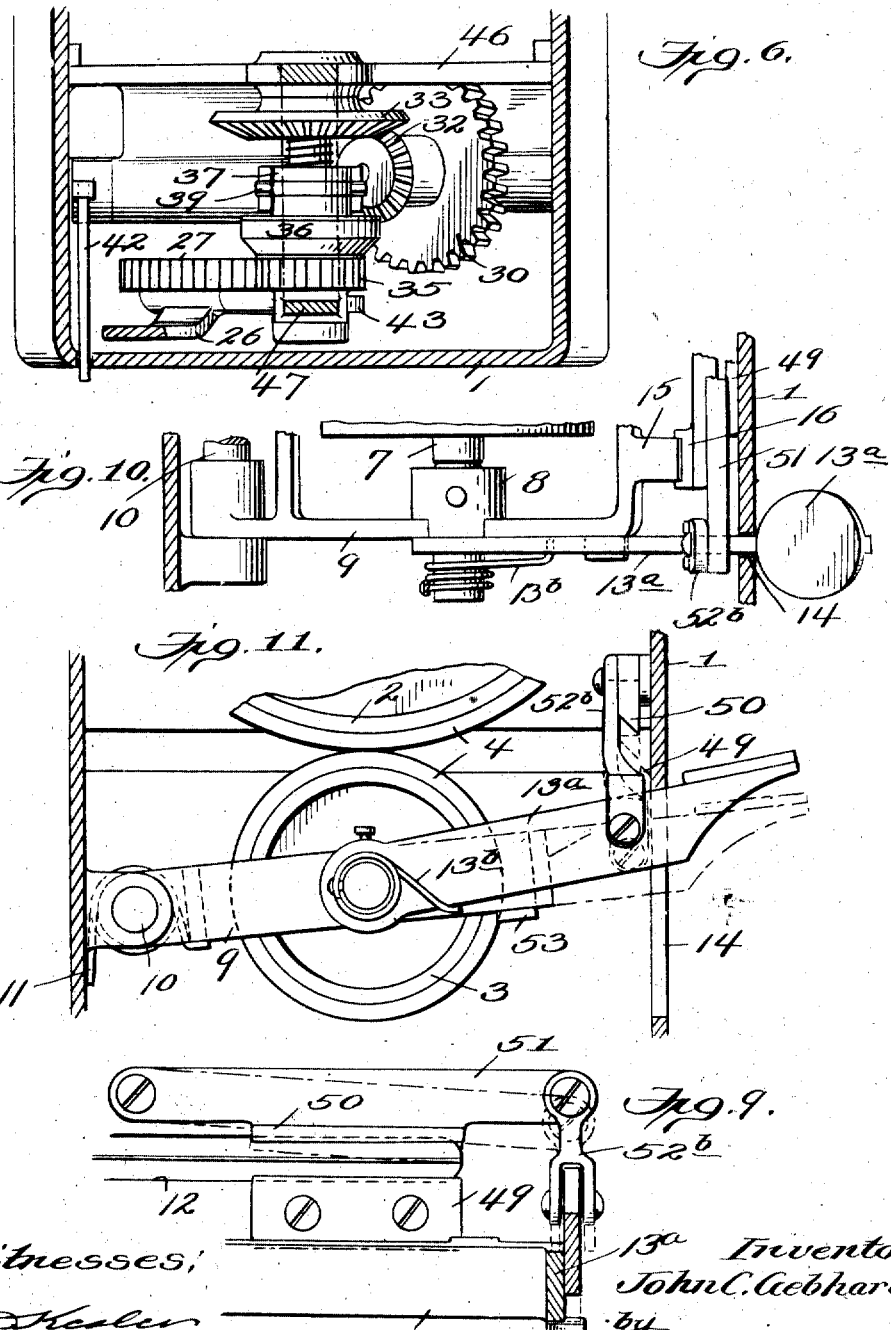

JOHN C. GEBHART, OF ST. LOUIS, MISSOURI, ASSIGNOR, BY MESNE ASSIGNMENTS, TO ECONOMETER COMPANY, OF ST. LOUIS, MISSOURI, A CORPORATION OF MISSOURI.

MACHINE FOR MEASURING TEXTILE FABRIC AND COMPUTING THE PRICE THEREOF.

1,250,844.     Specification of Letters Patent.     Patented Dec. 18, 1917.

Application filed March 17, 1916. Serial No. 84,900.

*To all whom it may concern:*

Be it known that I, JOHN C. GEBHART, a citizen of the United States, residing at St. Louis, in the State of Missouri, have invented new and useful Improvements in Machines for Measuring Textile Fabric and Computing the Price Thereof, of which the following is a specification.

This invention relates to an improved machine for measuring textile fabric and computing the price thereof. The invention proposes more particularly a machine of the general type disclosed in my co-pending application Serial No. 84,899 wherein the operation is produced by the passage of the fabric between a pair of rollers.

The chief object of the invention, briefly stated, is to provide a machine of the character described which, having the principal advantages of the machine disclosed in my said co-pending application Serial No. 84,899, may be readily adapted for the measurement of relatively great lengths of material, such as are sold at wholesale or, occasionally, at retail, without any accompanying necessity for making the machine of inconveniently large size or of substantially greater size than is required for the measurement of average retail lengths.

The invention consists in certain features of structure, combination and relation which, together with the above and other objects and advantages will appear as the description proceeds.

An embodiment of the invention is illustrated in the accompanying drawings, wherein:—

Figure 1 is a top plan view of a machine in which the features of the invention are incorporated;

Fig. 2 is a central longitudinal sectional view but showing the gearing in side elevation;

Fig. 3 is a cross-sectional view on the line 3—3 of Fig. 2;

Fig. 4 is a front elevation;

Fig. 5 is a horizontal sectional view on the line 5—5 of Fig. 3, the upper roller being omitted;

Fig. 6 is a horizontal sectional view on the line 6—6 of Fig. 3;

Fig. 7 is a detail sectional view showing more particularly the arrangement of the blades of the knife which slits the margin of the fabric along the line from which the measured length of the fabric is to be ripped or cut from the rest of the fabric;

Fig. 8 is a detail view showing a modification in the construction of the knife; and Figs. 9, 10 and 11 are detail side sectional plan and end elevations showing a modification in the construction of the knife operating means.

Similar characters of reference designate corresponding parts throughout the several views.

The operative parts of the machine are housed in a casing 1 whose lower portion incloses upper and lower rollers 2 and 3.

The rollers 2 and 3 are similar as regards their construction, relation to one another and to the casing 1, and operation, to the rollers 2 and 3 shown in my co-pending application Serial No. 84,899. However, in order that the disclosure of the present application may be complete in itself and may not entail the necessity of a reference to the patent to mature from my said co-pending application, the rollers 2 and 3 and their appurtenances will now be described in detail.

The operation of the machine is due to the rotation of the upper roller 2 which is, therefore, a power roller; and the roller 2 is rotated for this purpose by the passage between it and the roller 3 of the edge portion of the strip of fabric to be measured and sold. The rollers 2 and 3 have their circumferential faces of suitable form to frictionally engage the fabric drawn between them, and for this purpose, it is preferred to provide the metal body parts of the said rollers with soft rubber facings 4.

The roller 2 is mounted on or formed in one with a horizontal shaft 5 which is disposed in the central longitudinal plane of the machine and has its ends supported by fixed bearings 6. The roller 3 is mounted on or formed in one with a shaft 7 arranged under and parallel to the shaft 5; and in order that the rollers may be spaced, at times, to provide for the introduction between them of the edge portion of the strip to be measured, the bearings 8 for the ends of the shaft 7 are carried by a vertically movable yoke 9. The side bars of the yoke 9 are pivotally mounted at their inner ends on a transverse bar 10 supported by the adjacent walls of the casing 1; and the yoke 9 (and therewith the roller 3) is urged upward by torsion springs 11 (Fig. 11) arranged concentrically to the bar 10. The springs 11 thus serve to hold the roller 3 against the roller 2 and to provide for such yielding of the roller 3 relatively to the roller 2 as may be necessary to compensate for variations in the thickness of the fabric passed through the machine.

The casing 1 is provided in its front and side walls with a slot 12 of suitable extent through which the fabric to be engaged between the rollers 2 and 3 is introduced.

In order to space the roller 3 from the roller 2 to enable the edge portion of the fabric to be placed between said rollers, the yoke 9 has a handle 13 which projects through a vertical slot 14 in the side wall of the casing 1 opposite to the side wall adjacent which the yoke 9 is pivoted and by which said yoke (and therewith the roller 3) is depressed. In order to hold the yoke 9 in its depressed position, the front cross-bar of said yoke is provided with a cam faced lug 15 (Figs. 5 and 10) which coöperates with a detent 16 pivoted between its ends, as at 17, to a lug projecting from the adjacent wall of the casing 1. The detent 16 is acted on by a spring 19 and its end, opposite that which is engaged by said spring, is formed as a shoulder 20 to engage against the adjacent wall of the casing 1 and thus limit the projection of the detent by the spring 19. The shoulder 20 is provided with a headed operating pin 21 which projects through the adjacent side wall of the casing 1 and is disposed externally of the casing at the same side thereof as the handle 13. The pin 21 is located under the slot 12 and between the front of the casing 1 and the handle 13. By virtue of this arrangement, said pin may be readily operated, i. e., pushed inwardly to disengage the detent from the lug 15, in connection with the act of introducing the marginal portion of the fabric to be measured between the rollers 2 and 3.

The features of construction above described are disclosed in my said co-pending application Serial No. 84899.

According to the present invention, the price value and length indicating chart is stationary and is transversed by a bar having marked thereon numerals indicative of the price per yard of various fabrics.

The side walls of the casing 1 are preferably of flaring form at the upper end of said casing and are provided at a short distance below their upper edges with ledges 22 which support a transversely curved plate 23 whose upper face is presented convex. The plate 23 is arranged over the roller 2 in symmetrical relation to the central longitudinal plane of the machine. The stationary chart is printed directly on the upper face of the plate 23 or on a sheet of paper or the like which is secured to the upper face of the plate 23 and is visible through a glass panel 23ª, concentric to the plate 23, and which forms, in effect, the top wall of the casing 1, being suitably supported by the side and end walls of said casing. The said chart, indicated generally by the numeral 24, has adjacent the front of the machine a transversely disposed scale 24ª which carries numerals indicative of the length of material measured by the machine. The present drawings assume a machine having a capacity for twelve yards of material and the numerals of the scale 24ª are, therefor, 1–12. The scale 24ª is graduated into appropriate fractions of yards. The rest of the chart 24 is formed into squares which aline in the longitudinal direction of the machine with the sub-divisions of the scale 24ª and which contain numerals 24ᵇ indicative of the product of a particular measure on said scale times a particular price per yard. Thus, each numeral or numerical reading of the scale 24ª will be a factor of the numerals 24ᵇ in that row which is in alinement with the said numeral or numerical reading of the scale 24ª.

The chart 24 is in coöperation with and is traversed by a bar 25 which is disposed longitudinally of the machine and which, as stated, contains numerals indicative of the price per yard of various materials, these numerals being indicated at 24ᶜ. In the operation of the machine, the bar 25 is moved across the chart 24 and by its adjacency to a particular numeral or numerical reading of the scale 24ª furnishes a continuous and present indication of the length of material which has been measured. The numerals 24ᶜ are in transverse alinement with the transverse rows of numerals 24ᵇ and each numeral 24ᶜ is, of course, a factor of the numerals 24ᵇ in a transversely alining row. In this way, in any position of the bar 25 relatively to the chart 24 an instant indication of the price of the measured goods may be had by a reference to that numeral 24ᵇ of the chart 24 which is in alinement with the numeral or numerical reading of the scale 24ª adjoined by the bar 25 and which is also in transverse alinement with the numeral 24ᶜ on the bar 25 representing the price per yard of the material being sold.

The roller 2 is, of course, operatively connected to the bar 25 and the mechanism for effecting such operative connection is arranged under the plate 23.

The bar 25 is carried by an arm 26 rigidly secured to a sector 27. The shaft 5 of the roller 2 is utilized for the support of this sector whose hub 28 is loosely mounted upon an extended portion of said shaft. The extended portion of the shaft 5 carries a worm 29 which meshes with a worm wheel 30 set on a diagonal shaft 31 disposed in a transverse plane of the machine. The worm wheel 30 is connected by reducing gearing to the sector 27 and its hub carries as an element of such reducing gearing a relatively small bevel pinion 32 in mesh with a relatively large bevel pinion 33 on a shaft 34 disposed above and parallel to the shaft 5. The ratio of the pinions 32 and 33 or the number of teeth on the worm wheel 30 may be in accordance with any capacity for which it is desired to adapt the machine. On the assumption that the circumference of the roller 2 is a quarter of a yard, the capacity of the machine is twelve yards, and the worm wheel 30 has twenty-four teeth, the pinions 32 and 33 are herein disclosed as having a ratio of two to one. It is obvious that the machine disclosed may be adapted for the measurement of relatively long lengths of material and, hence, advantageously employed for wholesale merchandising or for stock taking, by substituting for a worm wheel 30 having twenty-four teeth as assumed a worm wheel having a greater number of teeth and by adapting the ratio of the pinions 32 and 33 to the capacity and extent of the chart 24 and the number of teeth of the worm wheel 30. In thus adapting or constructing the machine for the measurement of relatively long lengths of material as will be required for wholesale merchandising, it will be unnecessary to make the machine larger or substantially larger than when it is specially constructed for retail sales, as shown. In any event, therefore, the machine when supported on or adjacent the counter may have an elevation most convenient for the work in hand and will take up a minimum amount of space.

The shaft 34 carries a spur wheel 35 which is in mesh with the sector 27. The pinion 33 is fast on the shaft 34 and the spur wheel 35 is loose on said shaft.

To provide for an operative connection between the shaft 34 and the spur wheel 35 and at the same time to permit of the zero-setting of the bar 25, the spur wheel 35 has formed therewith a clutch member 36 (Fig. 2) which is engaged by a companion clutch member 37 rotatable with the shaft 34 and slidably mounted thereon. The engagement of the clutch member 37 with the clutch member 36 may be established by an expansive coil spring 38 surrounding the shaft 34 between the hub of the pinion 33 and the clutch member 37. The disengagement of the clutch members 36 and 37 is effected by the operation of a yoke 39 whose fork is engaged with trunnions or a ring mounted in a groove of the clutch member 37. The yoke 39 is mounted on a transverse rock shaft 40 having at one end thereof an arm 41 (Figs. 2 and 3) to which is connected an operating stem 42 (Figs. 3 and 6) projecting beyond the rear wall of the casing 1. It will be obvious that by pushing the stem 42 inward the yoke 39 will disengage the clutch member 37 from the clutch member 36 and thus allow the spur wheel 35 to run free of the shaft 34.

When the clutch member 37 is disengaged from the clutch member 36 the bar 25 is returned to zero position, its return movement being limited by the engagement of the arm 26 against the adjacent side wall of the casing 1. The means for returning the bar 25 to zero position preferably consists of a flat coil spring 43 (Fig. 3) surrounding the hub of the sector 27 and having its outer end connected to said sector and its inner end connected to the bracket 44 which provides a bearing for the outer end of the shaft 5.

The mechanism above described is supported from a transversely disposed plate 46 secured at its ends to lugs carried by the side walls of the casing 1. The plate 46 itself provides bearings for the shafts 5 and 34 and is provided with brackets 44 and 47 which provide bearings for the outer ends of the respective shafts 5 and 34. The plate 46 also carries cylindrical bearings 48 and 48ª for the respective shafts 40 and 31. The brackets 44 and 47 terminate in portions which over-hang and are parallel to the plate 46 and the elements of the mechanism mounted on the respective shafts 5 and 34, as described, are arranged between the plate 46 and the portions of the brackets 44 and 47 over-hanging and parallel to said plate.

The machine includes a means for notching the margin of the strip of material being measured upon the completion of the measuring operation, for the purpose of indicating the line along which the measured strip is to be ripped or cut from the rest of the goods. This means, as shown in Figs. 2, 3, and 7, is of the construction disclosed in my said co-pending application Serial No. 84,899 and consists of a knife which is combined with the yoke or carrier for the roller 3 and is operated by the downward movement of said yoke. The knife is shown in Figs. 7 and 8 and has a stationary blade 49 and a movable blade 50, the latter being mounted on a pivoted arm 51. The blade 49 is secured to that side of the wall of the casing 1 from which the strip of material is drawn and adjoins the lower edge of the slot 12. The arm 51 is pivoted at one end thereof above the upper edge of said slot and its other end is connected by a link 52 to one of the side bars of the yoke 9 or to the handle 13, the pivotal connection between the link 52 and the yoke 9 being somewhat loose.

In operation the yoke 9 is first depressed to permit of the introduction of the material between the rollers 2 and 3, and to cause the blade 50 to extend across the slot 12 and prevent the front edge of the strip of material from being inserted through the said slot. The operator, who stands at the rear of the machine, then inserts the strip of material through the slot 12 in a direction transverse to the machine as far as permitted by the lowered plate 50 and thereupon the detent 16 is operated to disengage the lug 15 and the yoke 9 is raised to throw the roller 3 against the roller 2. At such time, the blade 50 clears the slot 12 to enable the passage of the material therethrough. The clerk then draws the material through the slot 12 until the length of material requested has been measured, as shown by the adjacency of the bar 25 to one of the numerals or graduations of the scale 24ª. Thereupon, the operation of the machine is stopped and the yoke 9 is depressed to space the roller 3 from the roller 2 and to prepare the machine for another operation. As the yoke 9 is depressed, the blade 50 moves across the slot 12, slitting the marginal portion of the material. The material is now withdrawn from the machine and the slit in the marginal portion thereof indicates the line along which the measured length is to be ripped or cut.

Fig. 8 shows a modification in the construction of the knife according to which a rotary cutter 50ª coöperates with the blade 49 in substitution for the blade 50 of the construction shown in Fig. 7. The cutter 50ª is mounted upon one arm of a bell crank lever 51ª which is connected by a link 52ª to the yoke 9 or to the handle 13 and which is so formed that the cutter 50ª has a downward operative sweep and commences its cutting operation immediately with the downward movement of the roller 3.

Figs. 9, 10 and 11 show a modification in the construction of the yoke 9 and in the relation of this yoke to the knife. The yoke 9, instead of having the handle 13 rigid therewith, as in the embodiment described, has a handle 13ª which is pivotally mounted on an extension of one of the bearings of the shaft 7 of the roller 3. The handle 13ª, like the handle 13, may be operatively combined with either of the knife constructions above described but it is shown in connection with the knife 49—50 and is connected to the arm 51 by a link 52ᵇ, the said handle 13ª being urged upward by a suitable spring 13ᵇ. The handle 13ª has an initial downward movement relatively to the yoke 9 and thereafter its downward movement is transmitted to said yoke. For this purpose, the side bar of the yoke 9, adjacent the handle 13ª, is provided with a laterally projecting lug 53 which said handle engages upon the completion of its initial relative movement and the downward movement of the yoke 9 with the handle 13ª is obviously due to the engagement of said handle with the lug 53. The advantages of this construction are that the cutting operation of the blade 50 may be partially completed before the downward movement of the roller 3 is commenced, whereby the fabric will be securely held by the rollers 2 and 3 during the first part of the operation of the knife; and a slit of greater length may be provided without increasing the length of the blades.

I claim—

1. In a machine of the class described, in combination, upper and lower rollers, price computing means including a stationary curved chart arranged over the upper roller and a bar movable across the chart in a direction transverse to the machine and registering thereon, a pivoted arm carrying said bar and movable in a vertical plane, said arm being located adjacent one end of the upper roller and reducing gearing between the shaft of the upper roller and said arm for operating said arm.

2. In a machine of the class described, in combination, upper and lower rollers, price computing means including a chart and a bar movable across the chart and registering thereon, a sector provided with a projecting arm carrying said bar, a spur wheel operating said sector, a worm wheel driven from the shaft of one of said rollers, reducing miter gearing operated by said worm wheel, and clutch means for connecting or disconnecting one of said miter gears and said spur wheel.

3. In a machine of the class described, in combination, upper and lower rollers, price computing means including a stationary curved chart and a bar movable across the chart in a direction transverse to the machine and registering thereon, a pivoted arm carrying said bar and movable in a vertical plane, said arm being located adjacent one end of the upper roller, and gearing for operating said arm from the shaft of the upper roller comprising a worm on said shaft, a worm wheel operated by said worm, a sector operating said arm, a spur wheel operating said sector and reducing gearing between said worm wheel and said spur wheel.

4. In a machine of the class described, in combination, upper and lower rollers, price computing means including a stationary chart and a bar movable across the chart in a direction transverse to the machine and registering thereon, a pivoted arm carrying said bar, a pair of coöperating gear elements for actuating said arm, a re-setting spring connected to one of said gear elements, reducing gearing for driving said gear elements from the shaft of one of said rollers and clutch means for connecting or disconnecting an element of said reducing gearing and one of said first-named gear elements.

5. In a machine of the class described, in combination, upper and lower rollers, price computing means including a stationary chart and a bar movable across the chart and registering thereon, a sector operating said bar, a resetting spring acting on said sector, a spur wheel operating said sector, reducing gearing between the shaft of one of said rollers and said spur wheel to operate said wheel and clutch means for connecting or disconnecting an element of said reducing gearing and said spur wheel.

6. In a machine of the class described, in combination, upper and lower rollers, one of said rollers having its shaft provided with an extension, price computing means including a stationary curved chart and a bar movable across the chart in a direction transverse to the machine and registering thereon, a worm on said shaft extension, a sector loosely mounted on said shaft extension, an arm carrying said bar and secured to said sector, a shaft parallel to and arranged above said shaft extension, a bevel pinion fast on the second-named shaft, a spur wheel loose on the second-named shaft and meshing with said sector, clutch means for connecting and disconnecting said second named shaft and said spur wheel, a worm wheel operated by said worm and a smaller bevel pinion rotating with said worm wheel and meshing with said first-named bevel pinion.

7. In a machine of the class described, in combination, upper and lower rollers, one of said rollers having its shaft provided with an extension, price computing means including a stationary curved chart and a bar movable across the chart in a direction transverse to the machine and registering thereon, a worm on said shaft extension, a sector movable in a vertical plane transverse to the machine, an arm carrying said bar and secured to said sector, a shaft parallel to and arranged above said shaft extension, a spur wheel meshing with said sector, a bevel pinion mounted co-axially with said spur wheel, a movable clutch element for connecting and disconnecting said pinion and spur wheel, a worm wheel operated by said worm, a smaller bevel pinion rotating with said worm wheel and meshing with said first-named bevel pinion, a transverse rock shaft, a yoke secured to said rock shaft for operating said clutch element, an arm on said rock shaft, and a movable stem engaging said arm.

8. In a machine of the class described, in combination, upper and lower rollers, price computing means operated by the upper roller, a pivoted yoke carrying the lower roller, a pivoted handle carried by said yoke, a knife arranged in front of the rollers and including a movable arm provided with a blade, a link connecting said handle and said arm and a lug on said yoke for engagement by said handle at a period of its downward movement.

9. In a machine of the class described, in combination, upper and lower rollers, price computing means operated by the upper roller, a depressible carrier for the lower roller having a handle at the front end thereof, a knife arranged in front of the rollers and including a bell crank lever pivoted above the pass of the rollers, and a rotary cutter on the depending arm of said lever, and a link connecting the lateral arm of said lever and said handle.

In testimony whereof I have hereunto set my hand in presence of two subscribing witnesses.

JOHN C. GEBHART.

Witnesses:
  CHAS. S. HYER,
  JOHN S. POWERS.